US010940954B2

(12) United States Patent
Fass et al.

(10) Patent No.: US 10,940,954 B2
(45) Date of Patent: Mar. 9, 2021

(54) MULTISTAGE TURBOCHARGING SYSTEM FOR PROVIDING CONSTANT ORIGINAL CRITICAL ALTITUDE PRESSURE INPUT TO HIGH PRESSURE STAGE TURBOCHARGER

(71) Applicant: ISRAEL AEROSPACE INDUSTRIES LTD., Lod (IL)

(72) Inventors: Yehuda Fass, Lod (IL); Jacob Feldman, Mazkeret Batya (IL)

(73) Assignee: ISRAEL AEROSPACE INDUSTRIES LTD., Lod (IL)

( * ) Notice: Subject to any disclaimer, the term of this patent is extended or adjusted under 35 U.S.C. 154(b) by 232 days.

(21) Appl. No.: 15/757,828

(22) PCT Filed: Aug. 25, 2016

(86) PCT No.: PCT/IL2016/050930
§ 371 (c)(1),
(2) Date: Mar. 6, 2018

(87) PCT Pub. No.: WO2017/046788
PCT Pub. Date: Mar. 23, 2017

(65) Prior Publication Data
US 2018/0354629 A1 Dec. 13, 2018

(30) Foreign Application Priority Data
Sep. 17, 2015 (IL) .......................................... 241683

(51) Int. Cl.
*B64D 27/04* (2006.01)
*F02B 37/013* (2006.01)
(Continued)

(52) U.S. Cl.
CPC .............. *B64D 27/04* (2013.01); *F02B 37/00* (2013.01); *F02B 37/004* (2013.01);
(Continued)

(58) Field of Classification Search
CPC ...... F02B 37/004; F02B 37/013; F02B 37/18; F02B 37/183; F02D 41/0007; F02D 2200/703; F02D 2200/704; Y02T 10/144
See application file for complete search history.

(56) References Cited

U.S. PATENT DOCUMENTS

| 2,170,974 A | 8/1939 | Parkins |
| 2,233,031 A | 2/1941 | Price |
(Continued)

FOREIGN PATENT DOCUMENTS

| CN | 102748121 A | 10/2012 |
| EP | 1136676 A2 | 9/2001 |
(Continued)

OTHER PUBLICATIONS

International Search Report for International Application No. PCT/IL2016/050930 dated Dec. 8, 2016.

*Primary Examiner* — Laert Dounis
(74) *Attorney, Agent, or Firm* — Dorsey & Whitney LLP

(57) ABSTRACT

An aircraft engine system configured with a high pressure stage turbocharger assembly and a supplemental stage turbocharger assembly disposed in series with respect to said high pressure stage turbocharger, wherein the supplemental stage turbocharger assembly provides a compressor unit of the high pressure stage turbocharger with substantially constant critical altitude pressure input.

5 Claims, 6 Drawing Sheets

(51) Int. Cl.
  *F02K 3/075* (2006.01)
  *F02B 37/00* (2006.01)
  *F02B 37/18* (2006.01)
  *F02D 41/00* (2006.01)
  *F02B 61/04* (2006.01)

(52) U.S. Cl.
  CPC ............ *F02B 37/013* (2013.01); *F02B 37/18* (2013.01); *F02D 41/0007* (2013.01); *F02K 3/075* (2013.01); *F02B 61/04* (2013.01); *Y02T 10/12* (2013.01)

(56) References Cited

U.S. PATENT DOCUMENTS

| | | | |
|---|---|---|---|
| 3,250,068 A | | 5/1966 | Vulliamy |
| 3,548,597 A | | 12/1970 | Etessam |
| 3,941,104 A | | 3/1976 | Egli |
| 4,299,090 A | | 11/1981 | Deutschmann |
| 5,063,744 A | | 11/1991 | Ishiyama et al. |
| 5,081,842 A | | 1/1992 | Sugiyama et al. |
| 5,142,866 A | | 9/1992 | Yanagihara et al. |
| 5,144,803 A | | 9/1992 | Yoshioka et al. |
| 5,154,057 A | | 10/1992 | Yoshioka et al. |
| 5,154,058 A | | 10/1992 | Mizuno |
| 5,168,707 A | | 12/1992 | Yoshioka et al. |
| 5,186,005 A | | 2/1993 | Yoshioka et al. |
| 5,277,029 A | | 1/1994 | Kidokoro et al. |
| 5,850,738 A | * | 12/1998 | Hayashi .................. F02B 37/18 60/602 |
| 6,076,353 A | | 6/2000 | Freudenberg et al. |
| 6,112,523 A | * | 9/2000 | Kamo .................. F02B 37/013 60/600 |
| 6,311,493 B1 | | 11/2001 | Kurihara et al. |
| 6,422,014 B1 | | 7/2002 | Gladden |
| 6,550,247 B1 | | 4/2003 | Gladden |
| 6,801,846 B1 | | 10/2004 | Rodriguez et al. |
| 6,837,255 B2 | | 1/2005 | Bunch et al. |
| 7,000,393 B1 | | 2/2006 | Wood et al. |
| 7,958,730 B2 | | 6/2011 | Stewart |
| 2002/0056444 A1 | | 5/2002 | Chou et al. |
| 2002/0088230 A1 | | 7/2002 | Coleman et al. |
| 2002/0112478 A1 | | 8/2002 | Pfluger |
| 2003/0145810 A1 | | 8/2003 | Leman et al. |
| 2003/0213243 A1 | | 11/2003 | Pierpont |
| 2004/0008010 A1 | | 1/2004 | Ebrahim et al. |
| 2004/0112329 A1 | | 6/2004 | Coleman et al. |
| 2005/0056017 A1 | | 3/2005 | Sisken et al. |
| 2006/0021347 A1 | | 2/2006 | Sun et al. |
| 2006/0059910 A1 | | 3/2006 | Spaeder et al. |
| 2006/0070381 A1 | | 4/2006 | Parlow et al. |
| 2007/0039589 A1 | | 2/2007 | Stewart et al. |
| 2007/0062188 A1 | | 3/2007 | Fry et al. |
| 2007/0068171 A1 | | 3/2007 | Epstein |
| 2007/0074513 A1 | | 4/2007 | Lamb et al. |
| 2007/0240691 A1 | | 10/2007 | Geyer et al. |
| 2007/0295007 A1 | | 12/2007 | McNulty et al. |
| 2008/0053088 A1 | | 3/2008 | Yanakiev |
| 2008/0148727 A1 | | 6/2008 | de Ojeda |
| 2009/0265080 A1 | * | 10/2009 | Fry .................. F02B 37/013 701/103 |
| 2010/0017094 A1 | | 1/2010 | Borrelli et al. |
| 2010/0100300 A1 | | 4/2010 | Brooks et al. |
| 2010/0192890 A1 | | 8/2010 | Brooks et al. |
| 2010/0263638 A1 | | 10/2010 | Kogo et al. |
| 2011/0016862 A1 | | 1/2011 | Song et al. |
| 2011/0023848 A1 | | 2/2011 | Schwarte |
| 2011/0036086 A1 | | 2/2011 | Liu et al. |
| 2011/0041493 A1 | | 2/2011 | Doering et al. |
| 2011/0094221 A1 | | 4/2011 | Ge et al. |
| 2011/0154892 A1 | | 6/2011 | Ibuki et al. |
| 2011/0192160 A1 | | 8/2011 | Takahashi et al. |
| 2011/0192161 A1 | | 8/2011 | Takahaski et al. |
| 2011/0301723 A1 | | 12/2011 | Pekar et al. |
| 2012/0036852 A1 | | 2/2012 | Beveridge et al. |
| 2012/0037254 A1 | | 2/2012 | Rossi |
| 2012/0039724 A1 | | 2/2012 | Rossi |
| 2012/0090582 A1 | | 4/2012 | Yacoub |
| 2012/0204556 A1 | | 8/2012 | Tomita et al. |
| 2012/0227400 A1 | | 9/2012 | Erdmenger et al. |
| 2013/0008161 A1 | | 1/2013 | Flohr |
| 2013/0074492 A1 | | 3/2013 | Chi et al. |
| 2014/0041384 A1 | | 2/2014 | Mischler et al. |
| 2014/0047833 A1 | | 2/2014 | Buckland et al. |
| 2014/0230430 A1 | | 8/2014 | Krug et al. |
| 2014/0260239 A1 | * | 9/2014 | Genter .................. F02B 37/004 60/599 |

FOREIGN PATENT DOCUMENTS

| | | |
|---|---|---|
| EP | 2873828 A1 | 5/2015 |
| FR | 2910542 A3 | 6/2008 |
| FR | 2926892 A1 | 7/2009 |
| GB | 652173 A | 4/1951 |
| GB | 2501922 A | 11/2013 |
| GB | 2507061 A1 | 4/2014 |
| WO | 0169045 A1 | 9/2001 |
| WO | 2007040071 A1 | 4/2007 |
| WO | 2009056636 A1 | 5/2009 |

* cited by examiner

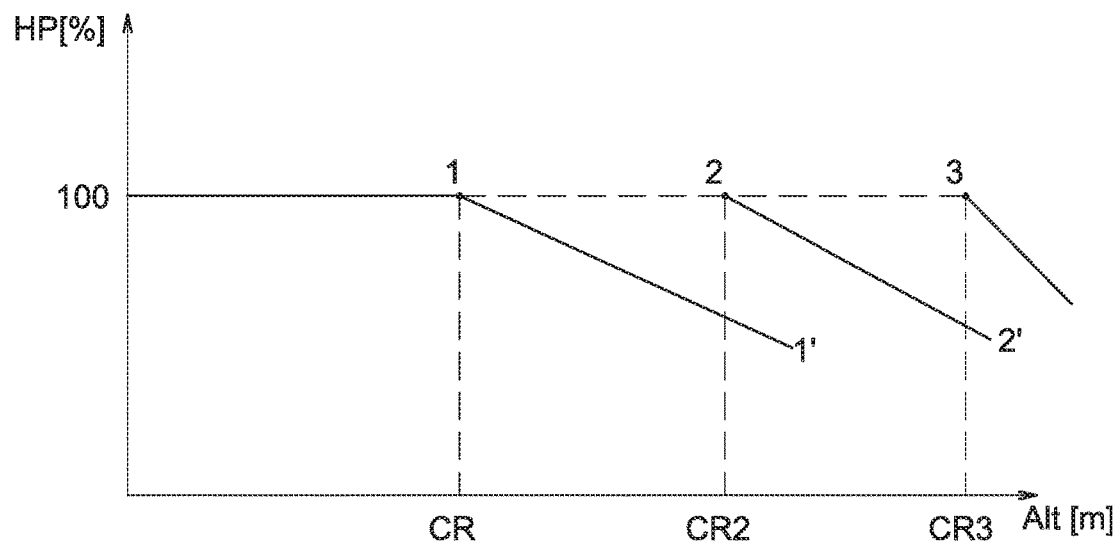
Fig.1
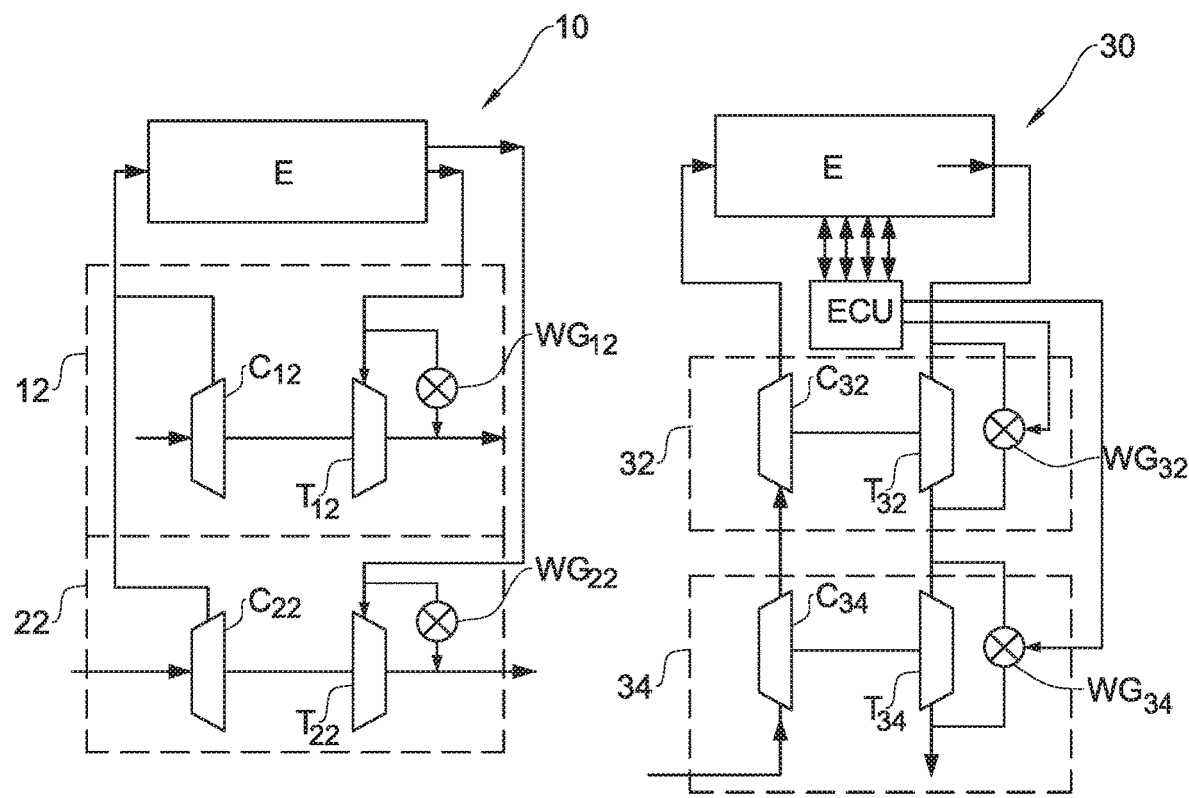
Fig. 2A
(Prior Art)
Fig. 2B
(Prior Art)

MULTISTAGE TURBOCHARGING SYSTEM FOR PROVIDING CONSTANT ORIGINAL CRITICAL ALTITUDE PRESSURE INPUT TO HIGH PRESSURE STAGE TURBOCHARGER

TECHNOLOGICAL FIELD

The present disclosure is generally in the field of turbochargers for use with internal combustion engines. More particularly, the disclosure is concerned with multistage turbochargers for use with internal combustion engines.

BACKGROUND ART

References considered to be relevant as background to the presently disclosed subject matter are listed below:
U.S. Pat. No. 7,958,730
GB2507061

Acknowledgement of the above references herein is not to be inferred as meaning that these are in any way relevant to the patentability of the presently disclosed subject matter.

U.S. Pat. No. 7,958,730 discloses multivariable dual stage series turbochargers having two degrees of freedom. A multistage series turbocharger apparatus has a low pressure turbocharger comprising a low pressure compressor and a low pressure turbine; a high pressure turbocharger comprising a high pressure compressor and a high pressure turbine, and a exhaust gas recirculation device. A controller controls the operation of at least two of the low pressure compressor, high pressure compressor, low pressure turbine, high pressure turbine, and exhaust gas recirculation device such that at least one operating parameter is maintained at about a selected value.

GB2507061 discloses a method of controlling an internal combustion engine, comprising a two-stage turbocharger, an exhaust gas recirculation (EGR) valve and a cylinder deactivation system, comprises setting a high pressure (HP) turbine, a HP turbine controlled by-pass, a low pressure (LP) turbine controlled by-pass and the EGR valve to first or second values taking into account the exhaust flow in the HP and LP by-passes, the expansion ratio in the HP turbine and instantaneous engine speed and load. The HP turbine, the HP and LP by-passes and the EGR valve are also set according to preset values for boost and EGR targets ramp-in. The method may also comprise the step of realizing a cylinders activation or deactivation, as well as controlling the EGR and boost in closed loop. The method may be carried out using a suitable internal combustion engine and control apparatus.

BACKGROUND

Turbocharged engines are well known in the art and have been utilized already at the beginning of the previous century and are nowadays used in a variety of engines, among others widely in aircraft engines.

As an aircraft climbs to higher altitudes ambient air density, and respectively air pressure, rapidly drop. Since the charge in the cylinders of the engine is pushed in by the ambient air pressure, the engine does not produce enough power and engine output drops substantially linearly to pressure drop. In order to enable aircrafts to fly at high altitudes and to take advantage of the low drag at high altitudes so as to fly faster, a turbocharger is used to overcome the problem of thin air, by compressing the ambient air back to sea-level pressure.

The turbocharger uses waste energy discharged from the engine at exhaust, using a turbine, to drive a compressor and compresses the ambient air so that the engine is fed with higher pressure than ambient pressure, the object being to maintain the engine input pressure at sea-level pressure.

The size of the turbocharger is chosen to produce a given amount of pressure at high altitude, and however since each turbocharger has efficiency limitations depending on the input/output ratio, depending on parameters such as weight, size, inertia, losses, etc. Alternatively, two or more superchargers are used in series, wherein the overall compression ratio is a multiplication of the compression ratio of the superchargers.

The speed of the turbocharger is controlled by a wastegate (typically automatically adjustable). When the aircraft is at low altitude the wastegate is usually open, thus venting exhaust gases, and as the aircraft climbs and the air density drops, the wastegate gradually closes so as to maintain full power. The altitude at which the wastegate fully closes and the engine still produces full power is referred to as the 'critical altitude'. When the aircraft continues its climb above the critical altitude, engine power output decreases as altitude increases, just as it would in a naturally aspirated engine. As a turbocharged aircraft climbs, however, the wastegate gradually closes, forcing more exhaust gas through the turbocharger turbine, thereby maintaining manifold pressure during the climb, at least until the critical pressure altitude is reached (when the wastegate is fully closed), after which manifold pressure falls.

A turbocharged aircraft engine which has been qualified for a particular flight envelope (flight performance envelope) receives a flight certification. Any alteration of an aircraft engine or engine associated systems requires issuance of a new flight certification, that being a complex and costly process.

GENERAL DESCRIPTION

It is an aim of the present disclosure to provide a turbocharged aircraft engine system configured with an increased critical altitude, however without actual changes made to the engine or turbocharger, and wherein a flight certificate still applies, and wherein only a supplemental supercharging assembly requires to be certified at a supplemental certification process.

According to the presently disclosed subject matter, there is provided an aircraft engine system configured with a high pressure stage turbocharger assembly and a supplemental stage turbocharger assembly disposed in series with respect to said high pressure stage turbocharger, wherein the supplemental stage turbocharger assembly provides a compressor unit of the high pressure stage turbocharger with substantially constant critical altitude pressure input.

The arrangement according to the present disclosure is such that the supplemental stage turbocharger assembly is configured to provide the high pressure stage turbocharger assembly, namely the compressor of said high pressure stage turbocharger assembly, with pressure resembling sea level conditions. Accordingly, the critical altitude for the engine occurs at a higher altitude.

Hereinafter in the specification and claims the term supplemental stage turbocharger assembly denotes a low pressure turbocharger assembly which is not in direct contact with the engine or a control unit associated with the engine or with the high pressure stage turbocharger assembly.

The supplemental stage turbocharger assembly of the present disclosure can be added as a retrofit assembly to an aircraft engine. In such a case an original turbocharger assembly (initially configured with the engine) of the engine will be considered as the high pressure stage turbocharger assembly, and the supplemental stage turbocharger assembly will be attached in series to said original turbocharger assembly. Likewise, the supplemental stage turbocharger assembly provides the compressor unit of the original turbocharger with substantially constant original pressure input, up to the new critical altitude. Respectively the term original critical altitude denotes the critical altitude of the engine with the original turbocharger.

Accordingly, herein after in the specification and claims, the term high pressure stage turbocharger assembly denotes either an initially fitted turbocharger assembly (in the retrofit case) to which the supplemental stage turbocharger assembly as then attached, or a high pressure stage of a multistage turbocharger assembly fitted to an engine and further including a supplemental stage turbocharger assembly.

Any one or more of the following features, configurations and designs can be implemented in a turbocharged airborne engine system according to the present disclosure, individually or in various combinations thereof:

- The supplemental stage turbocharger assembly can be a multistage supplemental turbocharger assembly and comprises two or more turbochargers, however disposed in series to one another;
- A control system is associated with the high pressure stage turbocharger assembly an is a closed-loop control system, i.e. substantially does not transfer or receive control signals from the supplemental stage turbocharger assembly;
- The control system associated with the supplemental stage turbocharger assembly can be a closed-loop system, i.e. the supplemental stage turbocharger assembly substantially does not transfer or receive control signals from the high pressure stage turbocharger assembly;
- The engine system can further be configured with a TCU (Turbocharger Control Unit) configured for controlling pressure parameters of the high pressure stage turbocharger assembly, i.e. controlling the pressure inlet to the engine from the compressor of the high pressure stage turbocharger assembly;
- The TCU controls a wastegate associated with the high pressure stage turbocharger assembly;
- As long as the engine assembly is exposed to pressure within the critical altitude, the TCU reads actual ambient pressure conditions, and however after said critical altitude the TCU reads pressure parameters generated by the supplemental stage turbocharger assembly;
- A supplemental wastegate is associated with the supplemental stage turbocharger assembly, said supplemental wastegate configured for assuring that a compressor of the supplemental stage turbocharger assembly generates pressure corresponding with that residing at the critical altitude;
- A supplemental TCU can be configured at the supplemental stage turbocharger assembly for monitoring pressure outlet at the compressor of the supplemental stage turbocharger assembly, so as to generate a control signal to the supplemental wastegate to close/open respectively;
- The engine and the high pressure stage turbocharger assembly, as well as the control unit associated therewith, remain substantially intact in-spite of the addition of the supplemental stage turbocharger assembly.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

FIG. 1 is a graph schematically representing performance of an airborne engine with and without a supplemental turbocharger assembly;

FIG. 2A is a block diagram of a prior art airborne engine configured with a high pressure stage turbocharger assembly and a supplemental stage turbocharger assembly disposed in parallel with respect to said high pressure stage turbocharger assembly;

FIG. 2B is a block diagram of a prior art airborne engine configured with a high pressure stage turbocharger assembly and a supplemental stage turbocharger assembly disposed in series with respect to said high pressure stage turbocharger assembly and with a control unit;

DETAILED DESCRIPTION OF EMBODIMENTS

Figure 3A:
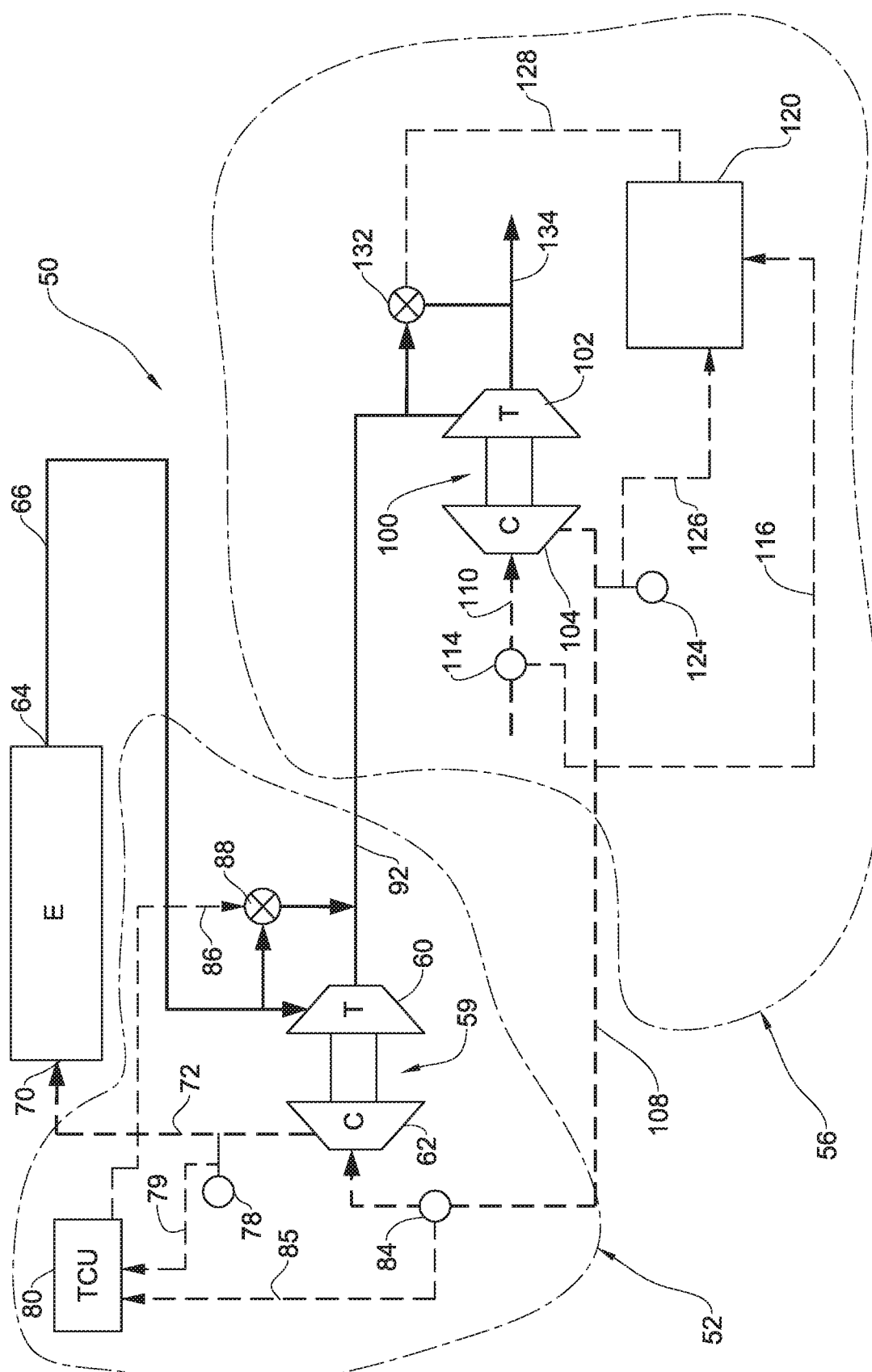
FIG. 3A is a block diagram of an airborne engine configured with a high pressure stage turbocharger assembly and a supplemental turbocharger assembly, according to an example of the present disclosure, illustrated without sensors.

The graph illustrated in FIG. 1 of the drawings represents performance of an airborne engine in terms of engine performance [HP %] vs. Altitude [meters]. The engine represented is configured with a high pressure stage turbocharger assembly and a supplemental stage turbocharger assembly disposed in series with respect to said high pressure stage turbocharger, wherein the supplemental stage turbocharger assembly provides a compressor unit of the high pressure stage turbocharger with substantially constant critical altitude pressure input.

It is noted that as long as the aircraft (namely the engine thereof) flies with the critical elevation zone, i.e. within the aircraft elevation envelope (point CR), the engine output is maximal and substantially constant. However, as the aircraft continues to climb with air density, and respectively air pressure, rapidly dropping, the engine's output would naturally drop (as represented by line segment 1-1'). However, this does not happen since the supplemental stage turbocharger assembly 'kicks in' namely provides the high pressure stage turbocharger assembly with a higher input pressure than ambient pressure (substantially constant pressure resembling ambient pressure at point CR), resulting in that the adjusted critical elevation zone (point CR2) is extended and the engine output remains substantially constant (represented by dotted line extending between points 1-2).

Likewise, if the aircraft will continue climbing beyond the adjusted critical elevation zone (point CR2) the engine's output would naturally drop (as represented by line segment 2-2'). Then, if the supplemental stage turbocharger assembly is a multiple stage turbocharger (i.e. an additional turbocharger is configured at the supplemental stage turbocharger assembly, in series with a high pressure stage turbocharger of the supplemental stage turbocharger assembly), the high pressure stage turbocharger assembly will then receive an 'amended' input pressure, i.e. corrected to substantially constant pressure resembling ambient pressure at point CR, resulting in that a new adjusted critical elevation zone (point CR3) is extended and the engine output remains substantially constant (represented by dotted line extending between points 2-3).

In FIG. 2A of the drawings there is illustrated a block diagram representing a first example of a prior art two-stage turbocharged engine, generally designated 10. The engine E is configured with a high pressure stage turbocharger assembly 12 and a low pressure stage turbocharger assembly 22, each configured with a turbine $T_{12}$, $T_{22}$ and a respective compressor $C_{12}$ and $C_{22}$, and a respective wastegate $WG_{12}$, $WG_{22}$. The system represented in this diagram is typically intended to increase the air flow to the engine. However, in the arrangement illustrated in FIG. 2A the first stage turbocharger assembly 12 and a second stage turbocharger assembly 22 are disposed parallel to one another, i.e. the output of each of the compressors $C_{12}$ and $C_{22}$ is directly connected to the input of the engine E and likewise, each of the turbines $T_{12}$ and $T_{22}$ is directly coupled to the output of the engine E.

FIG. 2B is also directed to a prior art two-stage turbocharged engine, generally designated 30, generally comprising an engine E configured with a high pressure stage turbocharger assembly 32 and a low pressure stage turbocharger assembly 34, each configured with a turbine $T_{32}$, $T_{34}$ and a respective compressor $C_{32}$ and $C_{34}$, and a respective wastegate $WG_{32}$, $WG_{34}$. However, in this example there is a control unit ECU (engine control unit), receiving/generating control signals from/to both the high pressure stage turbocharger assembly 32 and a low pressure stage turbocharger assembly 34 and the engine E.

Turning now to FIG. 3A of the drawings, there is illustrated a multi-stage turbocharged engine assembly according to a first example of the disclosure, generally designated 50, comprising an engine E, a high pressure stage turbocharger assembly generally designated 52, and a supplemental stage turbocharger assembly generally designated 56, disposed in series with respect to said high pressure stage turbocharger assembly 52.

The high pressure stage turbocharger assembly 52 comprises a turbocharger 59 with a turbine 60 and an associated compressor 62, wherein an inlet to the turbine 60 is coupled to an exhaust outlet port 64 of engine E through line 66. A pressure outlet of the compressor 62 is in turn coupled to an inlet port 70 of the engine E through pressure line 72.

A pressure sensor 78 generates a compressor output pressure signal, through line 79, to a TCU (Turbocharger Control Unit) 80 associated with the pressure at pressure line 72, said TCU 80 receiving also an intake pressure signal, via line 85, associated with the compressor intake pressure through intake pressure sensor 84. Responsive to said compressor output pressure signal at 78 and the intake pressure signal at 84 the TCU 80 generates a control signal through communication line 86 to a wastegate 88 disposed in communication between line 66 and an exhaust line 92 extending from the turbine 60, said control signal controlling the extent to which the wastegate 88 opens/closes.

The supplemental stage turbocharger assembly 56 comprises a supplemental turbocharger 100 with a turbine 102 and an associated compressor 104, wherein an inlet to the turbine 102 is coupled to exhaust line 92 extending from the high pressure stage turbine 60, and a pressure outlet from the compressor 104 is in turn coupled, through a pressure-monitored line 108 to the inlet of compressor 62 of the of the high pressure stage turbocharger assembly 52.

As can further be seen in FIG. 3A, the compressor 104 of the supplemental stage turbocharger assembly 56 has an ambient intake port 110 configured with an ambient pressure sensor 114. A supplemental TCU (Turbocharger Control Unit) 120 receives the ambient pressure signal generated by pressure sensor 114 through line 116, and further receives a pressure signal from pressure sensor 124 via control line 126, representative of pressure generated to the high pressure stage compressor 62 via pressure-monitored line 108. In turn, the TCU 120 generates control signal through communication line 128 to a wastegate 132 disposed in communication between line 92 (i.e. the exhaust line from the high pressure stage turbine 60) and an exhaust line 134 extending from the supplemental turbine 102 to the atmosphere (or to an additional turbocharger stage as discussed hereinafter with reference to FIG. 5). The control signal generated to wastegate 132 controls the extent to which the wastegate 132 opens/closes.

In the block diagrams of the present description, a pressure inlet line is designated by a thick dashed line (such as pressure lines 72 and 108), exhaust lines are designated by a solid thick line (such as lines 66 and 92), and control lines are designated by thin dashed lines (such as lines 79, 85, 86, 116, 128).

It is appreciated that the engine E and the associated high pressure stage turbocharger assembly 52, as well as the associated TCU 80, remain intact with no changes thereto. In fact, the TCU 80 governs only parameters associated with the high pressure stage turbocharger assembly 52, and respectively generates a control signal so as to close/open the wastegate 88, so as to determine if exhausted air from the engine E flows to the turbine 60 of the high pressure stage turbocharger assembly 52, or is discharged into line 92 (and from there either to the atmosphere or to the turbine 102).

Rather, the exhaust gases from the turbine 60 of the associated high pressure stage turbocharger assembly 52 are directed towards the turbine 102 of the supplemental stage turbocharger assembly 56, whilst the compressed air generated at the compressor 104 of the supplemental stage turbocharger assembly 56 is fed to the compressor 62 of the high pressure stage turbocharger assembly 52 (at need, i.e. when the aircraft climbs to an altitude above CR), whereby the compressor 62 is constantly exposed to pressure mimicking that residing at point CR, to thereby constantly provide the engine E with sea level conditions. With reference to the graph of FIG. 1 it appears that the supplemental stage turbocharger assembly 56 extends the substantially flat power output line of the engine, from point 1 to point 2.

From said point 1 to point 2 the pressure ratio read by the TCU 80 remains substantially constant and within that range wastegate 132 maintains predetermined constant pressure generation by turbocharger 100, to thereby maintain a constant pressure up to point 2.

The pressure and command signals at the supplemental stage turbocharger assembly 56 take place a closed loop, i.e. the high pressure stage turbocharger assembly 52 does not receive or transmit any signals or indications to the supplemental stage turbocharger assembly 56, and vise-versa.

Figure 5:
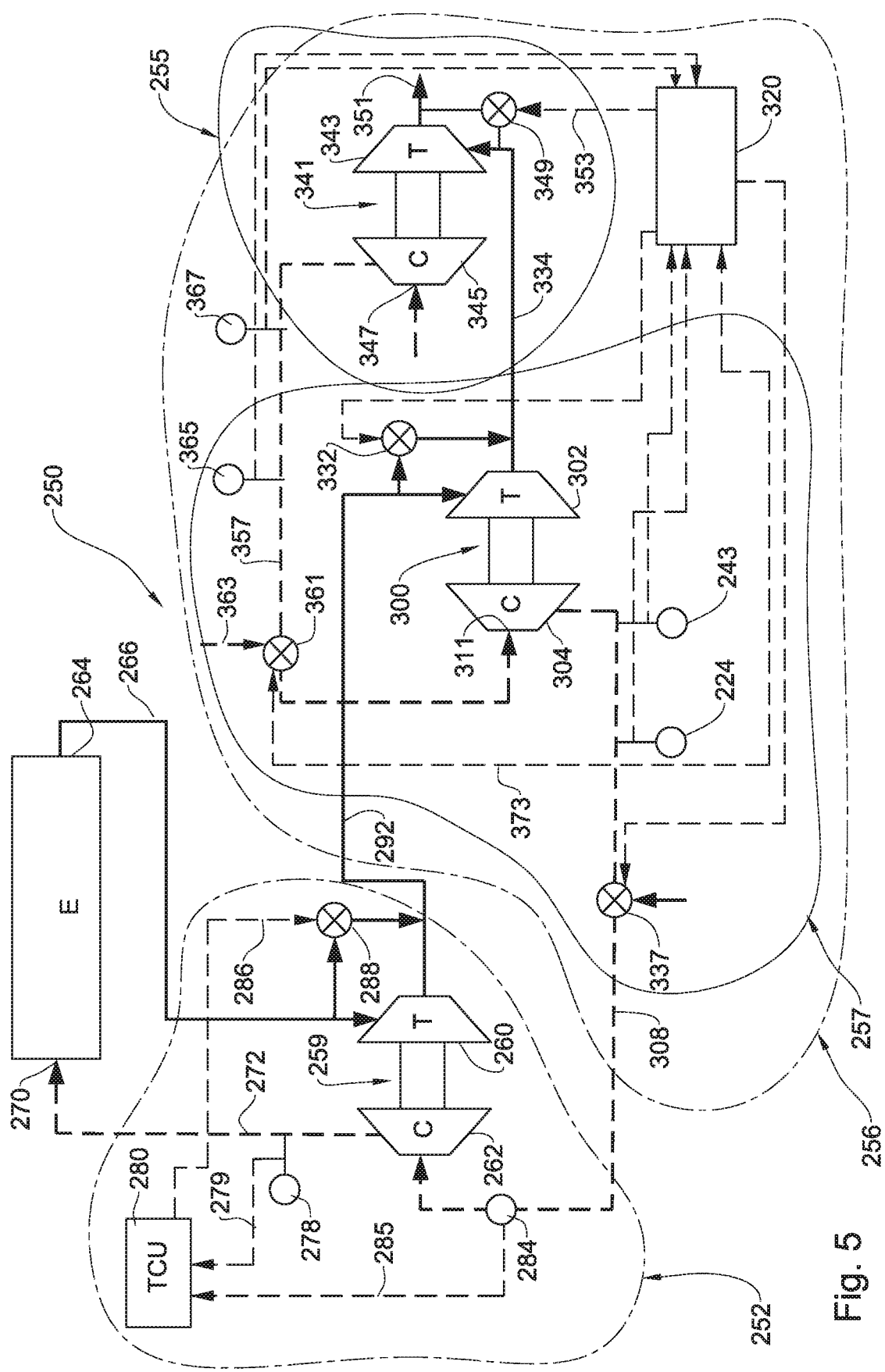
FIG. 5 is a block diagram of an airborne engine configured with a high pressure stage turbocharger assembly and a multistage supplemental turbocharger assembly, according to another example of the present disclosure.

In operation, the supplemental TCU 120 monitors the pressure output at compressor 104 (pressure sensor 124, via control line 126) and respectively generates a control signal to wastegate 132 to close or open, so as to ensure that the compressor 104 generates pressure corresponding with the pressure required to maintain point 1 (corresponding at elevation CR). Accordingly, when wastegate 132 closes gases received from the high pressure stage turbine (from line 92) are directed towards the turbine 102, and respectively, when the wastegate 132 is fully open gases are exhausted through exhaust line 134 to the atmosphere (or to another supplemental stage, if applicable; FIG. 5). The TCU 80 receives pressure parameters, (from sensor 84) within a constant range, i.e. either ambient pressure signal extending within the altitude range up to CR, or pressure signal mimicking ambient pressure at point CR, as received at compressor 62 from compressor 104, whilst sensor 78 generates a signal corresponding with the engine inlet pressure.

The arrangement is such that up to the critical elevation at CR, the pressure sensor 124 senses high pressure and accordingly the supplemental TCU 120 generates a command signal to the wastegate 132 to remain open. However, when pressure sensed by the pressure sensor 124 drops (i.e. when the airplane has further climbed), the supplemental TCU 120 generates a command signal to the wastegate 132 to gradually close, depending on the pressure output required. Other parameters are constantly collected and monitored by the supplemental TCU 120 such as temperature (sensor 143 in FIG. 3B) of the compressed air delivered to the compressor 62 of the high pressure stage turbocharger assembly 52, etc, to thereby ensure ideal and proper performance of the compressor 62. Accordingly, up to point 1 corresponding with altitude CR (graph of FIG. 1) the TCU 80 actually receives pressure signals corresponding with actual ambient parameters, whilst beyond that point it reads 'processed' pressure signals, as received from the supplemental stage turbocharger assembly 56, however mimicking ambient pressure at the altitude up to CR.

The TCU 80 ensures that the engine E continuously receives constant pressure (e.g. within the range 1-3 atm., depending on the engine) and thus the TCU 80 constantly compares the pressure signal received from pressure sensor 78 and that received from intake pressure sensor 84 to thereby generate a control signal to wastegate 88.

At the event that the airplane continues to climb above the critical elevation CR2, the wastegate 132 will open, to discharge pressure from line 92 to the atmosphere in order to maintain the turbocharger within its speed limit.

Figure 3B:
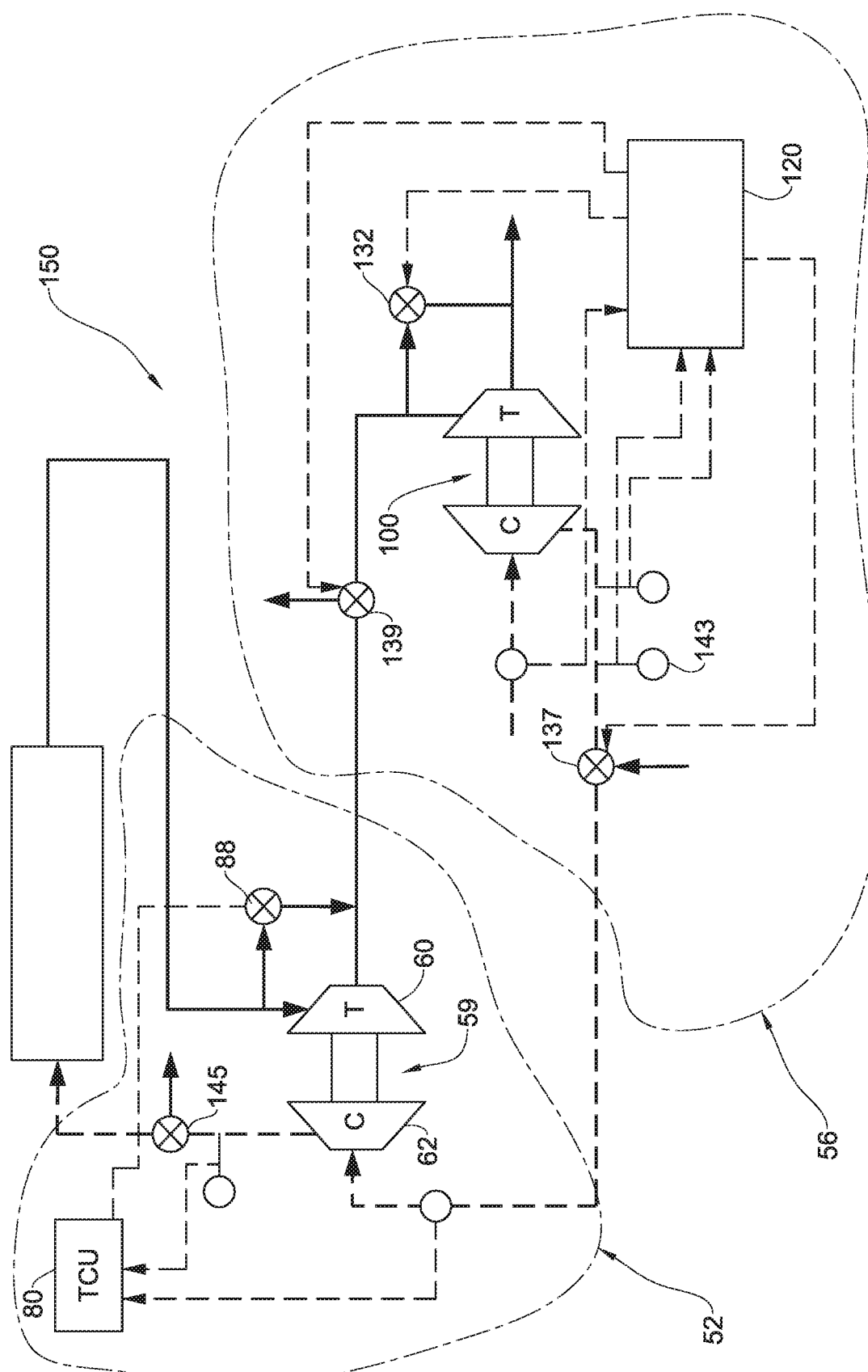
FIG. 3B is the same as FIG. 3A, however with sensors depicted.

With further reference to FIG. 3B, there is illustrated a block diagram of a system 150 substantially similar to that disclosed in FIG. 3A, however with some optional features. The system 150 is principally similar to the previous example, and operates in a similar fashion, whereby like elements are designated with same reference numbers.

An optional wastegate 137 is added to the supplemental stage turbocharger assembly 56. Also, an additional bypass wastegate 139 can be provided, both of said wastegates 137 and 139 governed by the TCU 120.

Also seen in FIG. 3B, the system can comprise a blow off protection valve 145 at the high pressure stage turbocharger assembly 52, configured for discharging excessive pressure from the system prior to reaching the engine E.

Figure 4A:
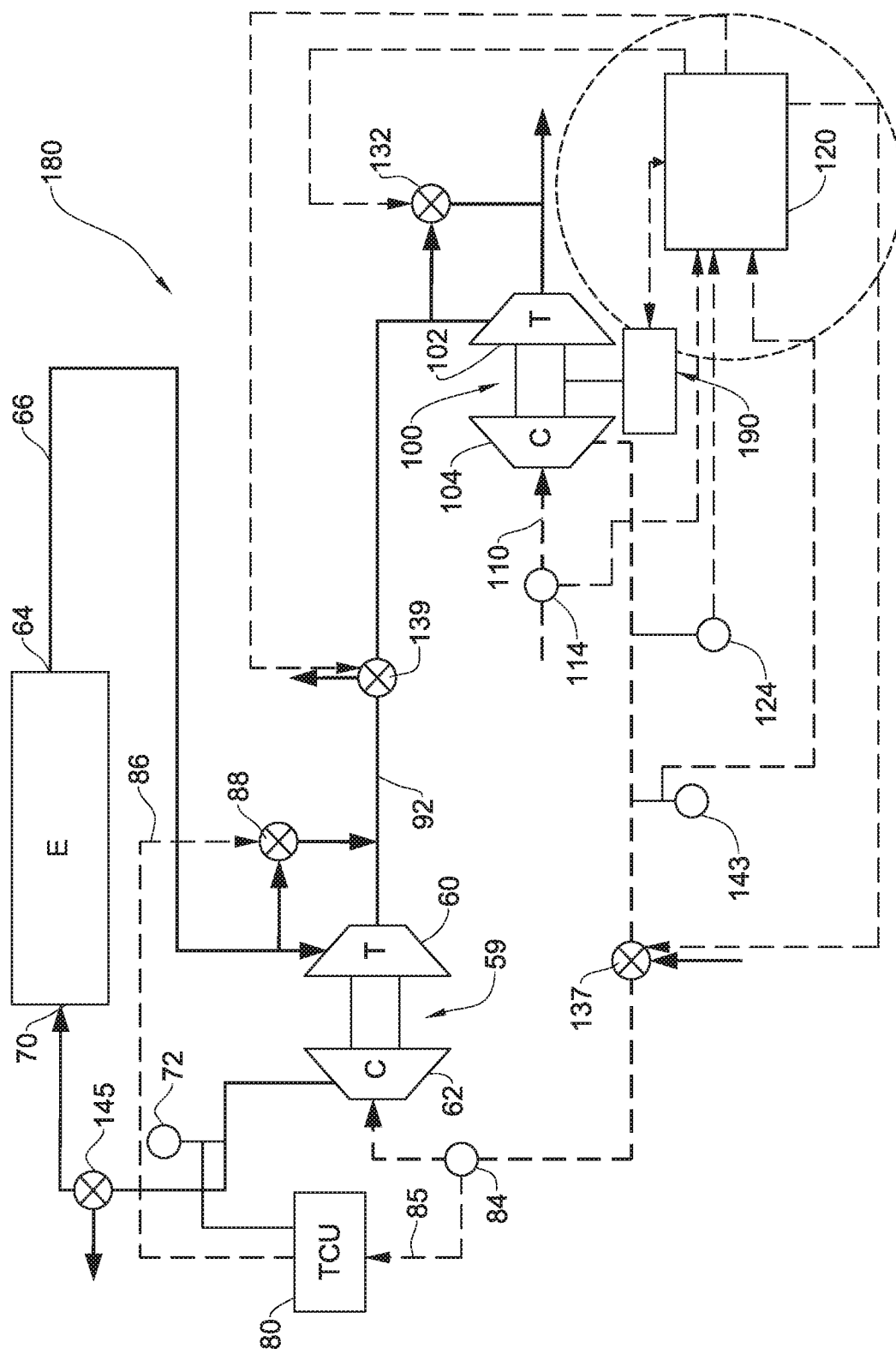
FIG. 4A is the same as FIG. 3B, however with an oil system depicted.
Figure 4B:
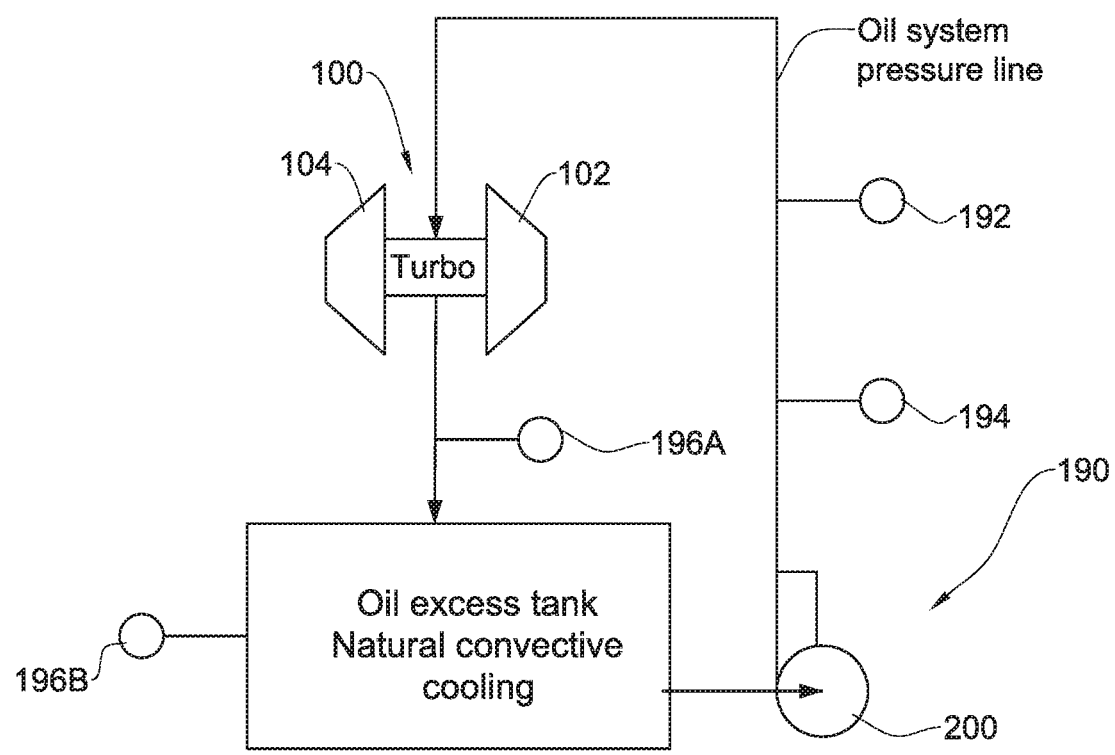
FIG. 4B is a block diagram of an oil system associated with an isolated turbocharger system.

In FIG. 4A of the drawings there is illustrated a block diagram of yet a modification of the disclosure of FIGS. 3A and 3B, generally designated 180. The system is principally similar to the previous examples, and operates in a similar fashion, whereby like elements are designated with same reference numbers. In addition to the components illustrated in FIGS. 3A and 3B, FIG. 4A includes also an oil system 190, associated with the supplemental stage turbocharger assembly 56, seen isolated in FIG. 4B. The oil system 190 comprises an additional pressure sensor 192 and a temperature sensor 194 configured for measuring these parameters along oil system pressure line, and several other temperature sensors 196A, 196B, said parameters being transmitted to and processed at the TCU 120 which also constantly monitors and governs the oil system 190 and the oil pump 200 (FIG. 4B) in coordination with the other parameters as mentioned herein above in connection with the previous example.

Further attention is now directed to FIG. 5 of the drawings illustrating a multi-stage turbocharged engine assembly according to another example of the disclosure, generally designated 250 and comprising an engine E and a turbocharging system following the principals discussed herein above, and wherein like elements are designated with like reference numbers, however shifted by 200.

The multi-stage turbocharged engine assembly 250 comprises a high pressure stage turbocharger assembly generally designated 252, and a multiple stage, supplemental stage turbocharger assembly generally designated 256, disposed in series with respect to said high pressure stage turbocharger assembly 252, wherein said supplemental stage turbocharger assembly 256 is a two stage turbocharger, comprising a first supplemental turbocharger assembly 257 (which acts within the supplemental stage turbocharger assembly 256 as a high pressure stage), and a second pressure supplemental turbocharger assembly 255 (which acts within the supplemental stage turbocharger assembly 256 as a low pressure stage).

The high pressure stage turbocharger assembly 252 in the illustrated example of FIG. 5, is identical with the high pressure stage turbocharger assembly 52 of FIGS. 3 and 4, and differences in the system 250 reside in the multiple stage, supplemental stage turbocharger assembly generally designated 256 and in the fashion it interacts with the high pressure stage turbocharger assembly 252, however following the principals of the previous examples, namely, that the engine E and the associated high pressure stage turbocharger assembly 252, as well as the associated TCU 280, remain intact with no changes thereto.

In fact, the TCU 280 governs only parameters associated with the high pressure stage turbocharger assembly 252, and respectively generates a control signal so as to close/open the wastegate 288, so as to determine if exhausted air from the engine E flows to the turbine 260 of the high pressure stage turbocharger assembly 252, or is discharged into line 292 (and from there either to the turbine 302 of the high pressure stage supplemental turbocharger assembly 257, i.e. high pressure stage, or into line 334). Accordingly, signals at the multiple stage supplemental stage turbocharger assembly 256 take place a closed loop, i.e. the high pressure stage turbocharger assembly 252 does not receive or transmit any signals or indications to the supplemental stage turbocharger assembly 256, and vise-versa.

The high pressure stage turbocharger assembly 252 comprises a turbocharger 259 with a turbine 260 and an associated compressor 262, wherein an inlet to the turbine 260 is coupled to an exhaust outlet port 264 of engine E through line 266. A pressure outlet of the compressor 262 is in turn coupled to an inlet port 270 of the engine E through pressure line 272.

A pressure sensor 278 generates a compressor output pressure signal, through line 279, to a TCU (Turbocharger Control Unit) 280 associated with the pressure at pressure line 272, said TCU 280 receiving also an intake pressure signal, via line 285, associated with the compressor inlet pressure through an intake pressure sensor 284. Responsive to said compressor output pressure signal at 278 and the intake pressure signal at 284 the TCU 280 generates a control signal through communication line 286 to a wastegate 288 disposed in communication between line 266 and an exhaust line 292 extending from the turbine 260, said control signal controlling the extent to which the wastegate 288 opens/closes.

The high pressure stage supplemental turbocharger assembly 257 comprises a high pressure stage supplemental turbocharger 300 with a turbine 302 and an associated compressor 304, wherein an inlet to the turbine 302 is coupled to exhaust line 292 extending from the high pressure stage turbine 260, and a pressure outlet from the compressor 304 is in turn coupled, through a pressure-monitored line 308 to the inlet of compressor 262 of the of the high pressure stage turbocharger assembly 252. The compressor 304 of the high pressure stage supplemental turbocharger assembly 257 is configured with an intake port 311, to be further discussed hereinafter.

A wastegate bypass 332 is disposed in communication between line 292 (i.e. the exhaust line from the high pressure stage turbine 260) and an exhaust line 334 extending from the supplemental turbine 302 to a turbine 343 of turbocharger 341 of the low pressure supplemental turbocharger assembly 255, i.e. low pressure stage supplemental turbocharger, said wastegate 332 governed by a supplemental TCU (Turbocharger Control Unit) 320.

The turbocharger 341 further comprises a compressor 345 associated with the turbine 343, said compressor 345 configured with an ambient air intake 347. A wastegate 349 is disposed in communication between line 351 (i.e. an exhaust line from the turbine 343 of the low pressure supplemental turbocharger 341, i.e. low pressure stage supplemental turbocharger) and an exhaust line 334 extending from the high pressure stage supplemental turbine 302, (i.e. high pressure stage supplemental turbocharger) to the turbine 343, with a control line 353 extending between the wastegate 349 and the supplemental TCU 320, wherein a control signal generated to wastegate 349 controls the extent to which the wastegate opens/closes, as discussed herein before.

Compressor 345 of the low pressure stage supplemental turbocharger 341 is in pressure communication through pressure line 357 with the compressor 304 of the high pressure stage supplemental turbocharger 300. Said pressure line configured with an additional bypass (optional) 361, for selective inlet of ambient air through line 363. Also disposed along pressure line 357 are a temperature sensor 365 and a pressure sensor 367, wherein said temperature sensor 365 and pressure sensor 367 are monitored and said additional bypass 361 is also governed by the supplemental TCU 320.

The supplemental TCU (Turbocharger Control Unit) 320, common for the high pressure stage supplemental turbocharger assembly 257 and the low pressure stage supplemental turbocharger assembly 255, further receives parameters associated with the monitored line 308, namely a pressure signal generated by pressure sensor 224 and a temperature signal generated by thermo-sensor 243. The supplemental TCU 320 also governs an additional wastegate 337 applied to pressure line 308 extending between compressor 304 and compressor 262.

Responsive to the monitored parameters, the supplemental TCU 320 generates control signals through communication line 353 to wastegate 349 and through communication line 373 to the additional bypass 361.

The arrangement is such that as the aircraft continues climbing beyond the adjusted critical elevation zone (point CR2 in FIG. 1) the engine's output would naturally drop (as represented by line segment 2-2').

At this event the low pressure supplemental turbocharger assembly 255 will kick-in, and wastegate 349 closes (controlled by TCU 320), such that exhaust gases from turbine 260 now flow through lines 292 towards turbine 302 and through line 334 into turbine 343. At this situation the turbine 343 drives the compressor 345 to compress ambient air (through inlet 347) and apply the compressed air through line 357 to the compressor 304 of the high pressure stage supplemental turbocharger 300 where it is further compressed and then delivered to the compressor 262 of the high pressure stage turbocharger assembly 252. Thus, the high pressure stage turbocharger assembly 259 then receives a constant input pressure, resembling the ambient pressure at CR, resulting in that a new adjusted critical elevation zone (point CR3 in FIG. 1) is extended and the engine output remains substantially constant (represented by dotted line extending between points 2-3). The amount of exhaust gases flowing through turbine 343 is governed by wastegate 349, determining the amount of gas discharged to the atmosphere through line 351.

The invention claimed is:

1. A method of retrofitting an aircraft engine system, the method comprising:
receiving the aircraft engine system including an initially fitted high pressure stage turbocharger assembly including a high pressure stage wastegate and a turbocharger control unit configured for controlling pressure input to an aircraft engine by controlling an extent to which the high pressure stage wastegate opens and closes; and
retrofitting the aircraft engine system by at least adding at least one retrofit supplemental stage turbocharger assembly to the aircraft engine in series with respect to the high pressure stage turbocharger of the initially fitted high pressure stage turbocharger assembly;
wherein the at least one retrofit supplemental stage turbocharger assembly including a supplemental wastegate and a supplemental turbocharger control unit separate and distinct from the turbocharger control unit;
wherein the supplemental turbocharger control unit is configured for controlling pressure input to the initially fitted high pressure stage turbocharger assembly by controlling an extent to which the supplemental wastegate opens and closes, so that the at least one retrofit supplemental stage turbocharger assembly provides a compressor unit of the initially fitted high pressure stage turbocharger assembly with substantially constant original critical altitude pressure input when the aircraft engine system is located above an original critical altitude and below a new critical altitude.

2. The method of claim 1 wherein adding at least one retrofit supplemental stage turbocharger assembly to the aircraft engine in series with respect to the high pressure stage turbocharger of the initially fitted high pressure stage turbocharger assembly includes attaching the at least one retrofit supplemental stage turbocharger assembly to the aircraft engine in series with respect to the high pressure stage turbocharger of the initially fitted high pressure stage turbocharger assembly.

3. The method of claim 1 wherein after the retrofitting, the turbocharger control unit of the high pressure stage turbocharger assembly is configured to be operated in a closed-loop system within the high pressure stage turbocharger assembly.

4. The method of claim 1 wherein after the retrofitting, the turbocharger control unit substantially does not transfer or receive control signals from the at least one retrofit supplemental stage turbocharger assembly.

5. The method of claim 1 wherein after the retrofitting, the at least one retrofit supplemental stage turbocharger assembly substantially does not transfer or receive control signals from the high pressure stage turbocharger assembly.

* * * * *